United States Patent
Martinez Canedo et al.

(10) Patent No.: US 12,455,729 B2
(45) Date of Patent: Oct. 28, 2025

(54) AUTOMATIC ARRANGEMENT OF HMI SCREENS

(71) Applicant: Siemens Aktiengesellschaft, Munich (DE)

(72) Inventors: Arquimedes Martinez Canedo, Plainsboro, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 196 days.

(21) Appl. No.: 18/553,848

(22) PCT Filed: Apr. 30, 2021

(86) PCT No.: PCT/US2021/030044
§ 371 (c)(1),
(2) Date: Oct. 4, 2023

(87) PCT Pub. No.: WO2022/231605
PCT Pub. Date: Nov. 3, 2022

(65) Prior Publication Data
US 2024/0184546 A1    Jun. 6, 2024

(51) Int. Cl.
*G06F 8/38* (2018.01)
*G06F 8/10* (2018.01)
*G06F 8/35* (2018.01)

(52) U.S. Cl.
CPC ............. *G06F 8/38* (2013.01); *G06F 8/10* (2013.01); *G06F 8/35* (2013.01)

(58) Field of Classification Search
None
See application file for complete search history.

(56) References Cited

U.S. PATENT DOCUMENTS

| | | | |
|---|---|---|---|
| 2021/0125031 A1* | 4/2021 | Keng | G06N 3/044 |
| 2023/0009814 A1* | 1/2023 | Hao | G06Q 30/0631 |
| 2023/0186307 A1* | 6/2023 | Park | G06N 3/045 |
| | | | 705/44 |
| 2023/0274986 A1* | 8/2023 | Khalajzadeh | G05B 19/41875 |
| | | | 438/5 |
| 2024/0265511 A1* | 8/2024 | Knuffman | G06T 7/579 |
| 2024/0362322 A1* | 10/2024 | Spain | G06N 20/00 |
| 2024/0377218 A1* | 11/2024 | Pandey | G01C 21/3837 |

(Continued)

OTHER PUBLICATIONS

Tianming, Zhao et al: "GUIGAN: Learning to Generate GUI Designs Using GenerativeAdversaria! Networks [v2]"; arXiv.org; Jan. 27, 2021 (Jan. 27, 2021), pp. 1-13,XP055879924.

*Primary Examiner* — Toan H Vu

(57) ABSTRACT

HMI screens are typically manually engineered or arranged. For example, HMI screens can include various elements, and an engineer often arranges the HMI elements on a given HMI screen, for instance one by one, until the final design of the HMI screen is complete. It is recognized herein that existing approaches to designing and arranging HMI screens lack efficiency, and can be tedious and redundant. Method, systems, and apparatuses described herein can automatically arrange elements of human-machine interface (HMI) screens. In an example aspect, a computing system includes a deep learning model, for instance an autoencoder or a generative adversarial network (GAN), configured to learn and design HMI screen arrangements.

13 Claims, 5 Drawing Sheets

(56) References Cited

U.S. PATENT DOCUMENTS

| | | | |
|---|---|---|---|
| 2024/0386353 A1* | 11/2024 | Manchenahally | ............................ G06Q 10/06375 |
| 2025/0050221 A1* | 2/2025 | Chen | ....................... A63F 13/67 |
| 2025/0061385 A1* | 2/2025 | Aghdasi | ................. G06N 20/00 |
| 2025/0077882 A1* | 3/2025 | Luzin | ..................... G06N 3/092 |

* cited by examiner

AUTOMATIC ARRANGEMENT OF HMI SCREENS

BACKGROUND

Many industrial processes and machinery are monitored and controlled by operators or engineers using human-machine interface (HMI) screens. HMI screens can display information related to operational statuses of components. In some cases, HMI screens can render operational controls so that a user can control one or more monitored processes or components via the HMI screen. HMI screens are typically manually engineered or arranged. For example, HMI screens can include various elements, and an engineer often arranges the HMI elements on a given HMI screen, for instance one by one, until the final design of the HMI screen is complete. It is recognized herein that existing approaches to designing and arranging HMI screens lack efficiencies, and designing and arranging the screens can be tedious and redundant.

BRIEF SUMMARY

Embodiments of the invention address and overcome one or more of the described-herein shortcomings by providing methods, systems, and apparatuses that automatically arrange elements of human-machine interface (HMI) screens. In an example aspect, a computing system includes a deep learning model, for instance an autoencoder or a generative adversarial network (GAN), configured to learn and design HMI screen arrangements. The system can collect or obtain historical project information that includes designs for a plurality of HMI screens. The collected HMI designs can define a plurality of arrangements of a plurality of HMI elements. A model, for instance a GAN, can be trained with the historical project information. The GAN can be configured to receive requirements for a new project. The requirements can define a list of HMI elements and specifications for at least one target HMI screen. Based on the requirements, the GAN can determine a design for the list of HMI elements on the at least one target HMI screen.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
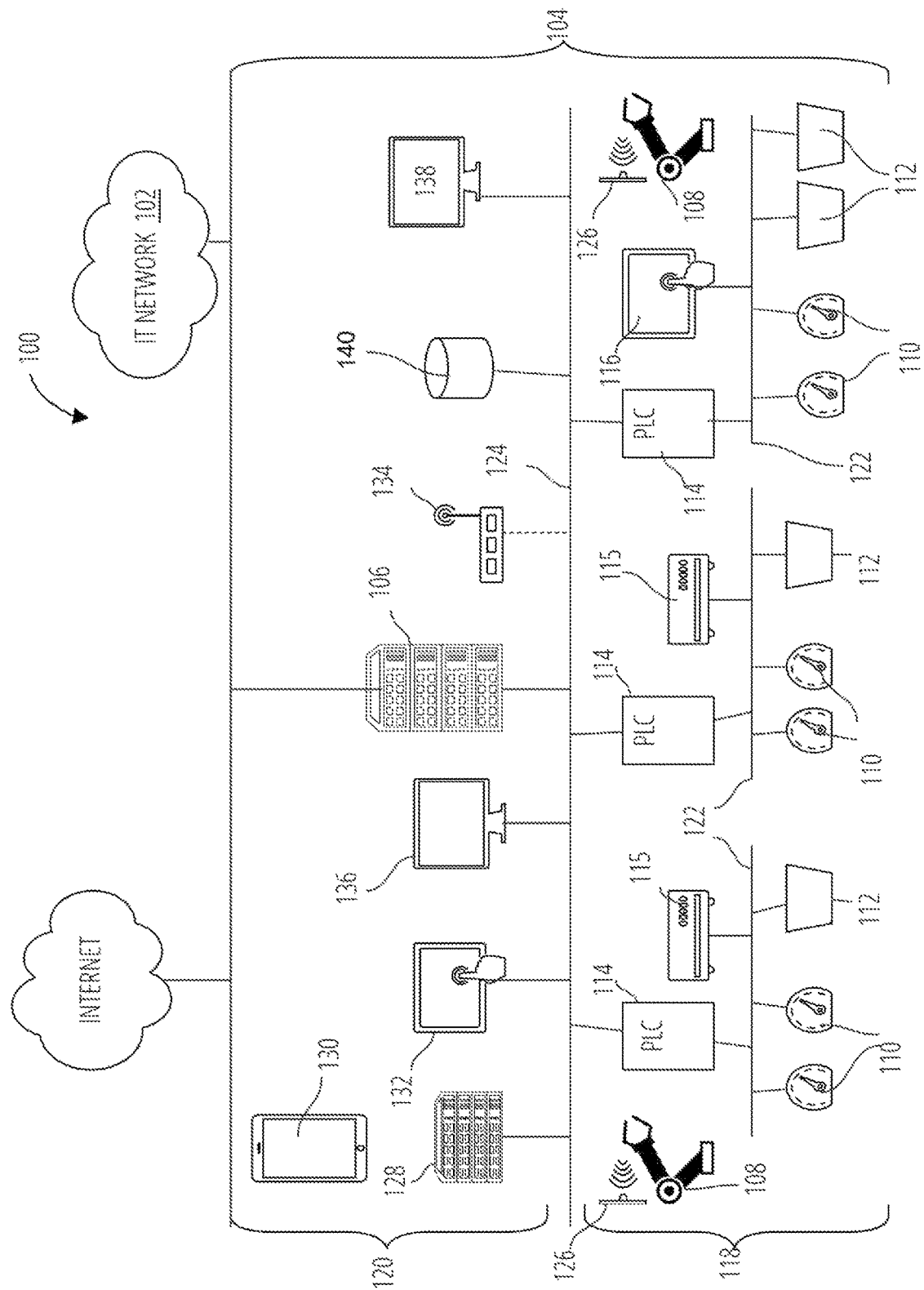
FIG. 1 is a block diagram of an example control system that includes a plurality of human-machine interface (HMI) screens, in accordance with an example embodiment.

As an initial matter, a human-machine interface (HMI) screen may refer to a panel having one or more physical displays. Thus, unless otherwise specified, display, screen, and panel may be used interchangeably herein, without limitation. A given HMI screen may define a small text-based display or a large panel having key or touch support. Example HMI screens further include, without limitation, PC-based panels and high resolution displays (e.g., televisions) associated with Supervisory Control and Data Acquisition (SCADA) servers.

By way of background, example existing approaches to HMI screen design are now further explored. In some cases, HMI screens that are designed manually by an engineer can be re-used for similar processes in a factory, for example. It is recognized herein, however, that such re-used HMI screens often still need to be manually customized, which can be time-consuming and tedious. For example, customization may be required to adapt an original HMI screen design for a first display to a second display that is different in size and/or has different capabilities (e.g., touch screen) as compared to the first display. Thus, it is recognized herein that even when an HMI screen is arranged for the same process or components so as to define an HMI master screen template, the screen may need to be altered or customized based on the physical display in which the screen is implemented. Further, existing approaches typically rely on a manual customization in which a user or engineer might have to ensure that the elements are arranged so as to fit within a given size. This manual customization may involve a user having to determine which elements stay on the screen or are omitted, as smaller panels have less lower information density than larger panels. Thus, it is recognized herein that master templates for HMI screens might be helpful in maintaining the look and feel of different panels in a particular factory, but often require tedious manual customization to fit within various constraints defined by different panels. It is further recognized herein that master templates might support a limited type or subset of HMI products, and thus cannot be applied to some HMI panels. For example, HMI products that belong to different product families might require different templates. In an example, a SIMATIC HMI design template might support WinCC Comfort (Comfort Panel) and Advanced (PC-based panel) but might not support SCADA products.

In various example embodiments further described herein, given a first HMI screen, a system can perform a layout operation on a second HMI screen such that the look and feel defined by the first HMI screen is transferred to the second HMI screen. Further, given a set of HMI elements, the system can automatically arrange the elements on any HMI screen. By way of example, in some cases, the system can determine that the set of HMI elements do not fit on a particular screen. In such cases, the system can prioritize the elements to display on the screen, or the system can generate additional screens. Alternatively, or additionally, the system can increase or decrease the size of elements in accordance with predetermined tolerances.

Referring initially to FIG. 1, an example industrial control system (ICS) 100 includes various HMI screens that can be implemented in accordance with embodiments described herein. The example system 100 includes an office or corporate IT network 102 and an operational plant or production network 104 communicatively coupled to the IT network 102. It will be understood that the ICS 100 is illustrated and simplified as an example, and HMI screens can be implemented in and other domains having other configurations, and all such systems are contemplated as being within the scope of this disclosure. For example, embodiments of the distributed control system can define an operational technology system, energy generation system (e.g., wind parks, solar parks, etc.), or an energy distribution network. 1 should also list OT (Operational Technology).

The production network 104 can include an abstraction engine 106 that is connected to the IT network 102. The production network 104 can include various production machines configured to work together to perform one or more manufacturing operations. Example production machines of the production network 104 can include, without limitation, robots 108 and other field devices, such as sensors 110, actuators 112, or other machines, which can be controlled by a respective PLC 114. The PLC 114 can send instructions to respective field devices. In some cases, a given PLC 114 can be coupled to one or more human machine interfaces (HMIs) 116.

The ICS 100, in particular the production network 104, can define a fieldbus portion 118 and an Ethernet portion 120. For example, the fieldbus portion 118 can include the robots 108, PLC 114, sensors 110, actuators 112, and HMIs 116. The fieldbus portion 118 can define one or more production cells or control zones. The fieldbus portion 118 can further include a data extraction node 115 that can be configured to communicate with a given PLC 114 and sensors 110.

The PLC 114, data extraction node 115, sensors 110, actuators 112, and HMI 116 within a given production cell can communicate with each other via a respective field bus 122. Each control zone can be defined by a respective PLC 114, such that the PLC 114, and thus the corresponding control zone, can connect to the Ethernet portion 120 via an Ethernet connection 124. The robots 108 can be configured to communicate with other devices within the fieldbus portion 118 via a WiFi connection 126. Similarly, the robots 108 can communicate with the Ethernet portion 120, in particular a Supervisory Control and Data Acquisition (SCADA) server 128, via the WiFi connection 126. The Ethernet portion 120 of the production network 104 can include various computing devices communicatively coupled together via the Ethernet connection 124. Example computing devices in the Ethernet portion 120 include, without limitation, a mobile data collector 130, HMIs 132, the SCADA server 128, the abstraction engine 106, a wireless router 134, a manufacturing execution system (MES) 136, an engineering system (ES) 138, and a log server 140. The ES 138 can include one or more engineering workstations. In an example, the MES 136, HMIs 132, ES 138, and log server 140 are connected to the production network 104 directly. The wireless router 134 can also connect to the production network 104 directly. Thus, in some cases, mobile users, for instance the mobile data collector 130 and robots 108, can connect to the production network 104 via the wireless router 134. In some cases, by way of example, the ES 138 and the mobile data collector 130 define guest devices that are allowed to connect to the abstraction engine 106. The abstraction engine 106 can be configured to collect or obtain historical project information. The historical project information can include HMI designs for a plurality of HMI screens. The HMI designs can define a plurality of arrangements of a plurality of HMI elements.

Example users of the ICS 100 include, for example and without limitation, operators of an industrial plant or engineers that can update the control logic of a plant. By way of an example, an operator can interact with the HMIs 132, which may be located in a control room of a given plant. Alternatively, or additionally, an operator can interact with HMIs of the ICS 100 that are located remotely from the production network 104. Similarly, for example, engineers can use the HMIs 116 that can be located in an engineering room of the ICS 100. Alternatively, or additionally, an engineer can interact with HMIs of the ICS 100 that are located remotely from the production network 104.

Figure 2:
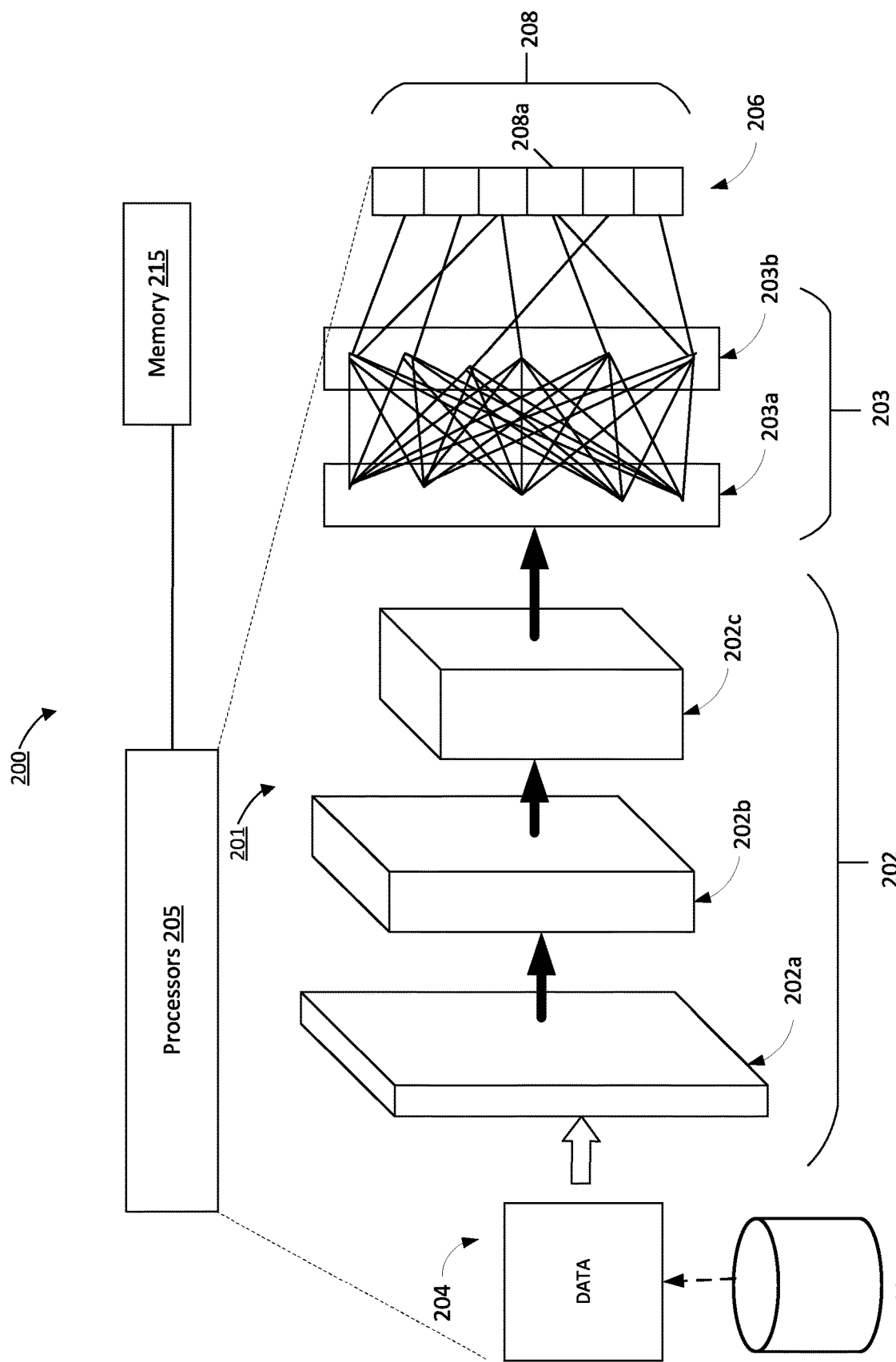
FIG. 2 depicts an example computing system that includes an autoencoder configured to learn and generate HMI designs in accordance with an example embodiment.

Referring also to FIG. 2, an example computing system 200 can be configured to generate screens for HMIs 114 and HMIs 132, among other interfaces such as, for example and without limitation, the MES 136, ES 138, and the mobile data collector 130. The computing system 200 can include various interfaces for receiving data from external systems. The computing system 200 can define one or more neural networks or statistical classification models, for instance a generative adversarial network (GAN) or autoencoder model 201, that can be configured to predict or generate HMI screens, for instance based on HMI elements. Unless otherwise specified, GAN, autoencoder, and model can be used interchangeably herein, without limitation. The computing system 200 can further include one or more processors 205 and a memory 215 storing a plurality of machine-readable instructions executable by the processors 205. The memory 205 may be implemented using any non-transitory. The computing system 200 may further include, or be communicatively coupled to, one or more databases 225 configured to store input data and output data associated with the GAN 201.

The GAN 201 can include a plurality of layers, for instance an input layer 202a configured to receive data, an output layer 203b configured to generate a reconstruction of the data or class scores associated with the data, and a plurality of intermediate layers connected between the input layer 202a and the output layer 203b. In some cases, the input layer 202a can be configured to receive a plurality of HMI elements, and the output layer 203b can be configured to generate class scores associated with various arrangement of the HI elements on various HMI screens. In an example, the intermediate layers and the input layer 202a can define an encoder 202. In some cases, the encoder 202 can include a plurality of convolutional layers. The intermediate layers and output layer 203b can define a decoder 203. The decoder 203 can include one or more fully connected layers. The encoder 202 can include the input layer 202a configured to receive training and test data. Example training data includes, without limitation, HMI projects that include historical arrangements of various HI elements on various HMI screens. The encoder 202 can further include a final convolutional or last feature layer 202c, and one or more intermediate or second convolutional layers 202b disposed between the input layer 202a and the final convolutional layer 202c. It will be understood that the illustrated model 200 is simplified for purposes of example. In particular, for example, models may include any number of layers as desired, in particular any number of intermediate layers, and all such models are contemplated as being within the scope of this disclosure.

As used herein, unless otherwise specified, HMI elements can refer to any software artifact that can be displayed. Example HI elements include, without limitation, text, charts, buttons, alarms, graphs, blinking or multi-colored indications, images, and the like.

The decoder 203, which can include a first layer 203a and a second or output layer 203b, can include connections between layers that are fully connected. For example, a neuron in the first layer 203a may communicate its output to every neuron in the second layer 203b, such that each neuron in the second layer 203b will receive input from every neuron in the first layer 203a. It will again be understood that the model is simplified for purposes of explanation, and that the model 201 is not limited to the number or configuration of layers illustrated in the decoder 203. For example, the encoder 202 and the decoder 203 may include layers that are convolutional or fully connected. In contrast to fully connected layers, convolutional layers may be locally connected, such that, for example, the neurons in the intermediate layer 202b might be connected to a limited number of neurons in the final convolutional layer 202c. The convolutional layers 202 can also be configured to share connections strengths associated with the strength of each neuron.

Still referring to FIG. 2, the input layer 202a of the GAN 201 can be configured to receive input data 204, and the output layer 203b can be configured to return an output 206 based on the input data 204. In some cases, the input data 204 is retrieved from the database 225. The input data 204 can include, for example and without limitation, an indication of HMI elements that are intended to be displayed, data (e.g., size, color, etc.) associated with the HI elements, one or more HMI panels or screens in which the HI elements are intended to be displayed, and historical HMI projects that define historical or previous arrangements of HMI elements on various screens. The output 206 can include a classification or arrangement associated with the input 204. For example, the output 206 can include an output vector that indicates a plurality of probabilities or class scores 208 for associated with various classifications (e.g., categories) or arrangements. Thus, the output layer 203b can be configured to generate probabilities (class scores) associated with input data 204. The class scores 208 can include a target class score 208a associated with the arrangement of HMI elements having the highest probability.

In some examples, the encoder 202 can process the input data 204 to generate encoder outputs. In particular, a given encoder output can represent its corresponding input data in the latent space. Thus, the encoder 202 can include a neural network that receives an input and outputs its hidden (latent) representation. In particular, given input data 204 can define a first number of dimensions, and the encoder 202 can encode the data of the input data 204 into the encoder output (or latent representation) that defines a second number of dimensions that is less than the first number of dimensions. Thus, the encoder 202 can learn an efficient compression of the data of the input data 204 into the lower dimensional space of the data of the encoder output. The encoder output can define a data distribution that can be characterized by parameters, for instance a mean and standard deviation. Using the parameters, the latent activations can be sampled so as to define a decoder input. Using the decoder input that is based on the latent space or encoder output, the decoder 203 can reconstruct the input 204 so as to generate the output 206 as corresponding reconstructed data. With respect to training the GAN 201, in accordance with some embodiments, the autoencoder 201 is trained on non-anomalous (normal) historical data, for instance non-anomalous HMI arrangement data obtained from the HMIs 114 and 132.

Figure 3:
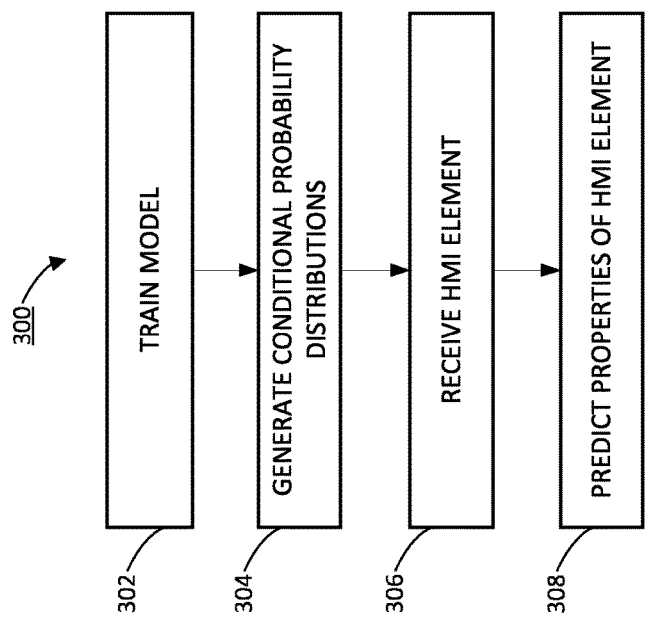
FIG. 3 is a flow diagram that depicts operations that can be performed by the computing system depicted in FIG. 2, in accordance with an example embodiment.

Referring now to FIG. 3, example operations 300 can be performed by the computing system 200. At 302, the GAN 201 is trained on input data. For example, the computing system 200 can obtain, for instance from the database 225, data that includes previous HMI projects. Such projects can include previous arrangements or designs of various HMI elements on HMI screens of various types and sizes. The training data, in particular the HMI projects, can further define various properties of the HMI elements on various historical HI screens. Example properties of the HMI elements that can be obtained by the GAN 201 include, without limitation, size properties associated with the elements (e.g., height, width), color, and spatial constraints. Spatial constraints can define various tolerances, such as minimum or maximum distances from other elements or portions (e.g., edge, center) of the screen. At 304, based on the data, the computing system 200, in particular the GAN 201, can generate conditional probability distributions associated with HMI elements. For example, the conditional probability distributions can indicate the probability that a given HI element is included in an HMI screen with one or more other HMI elements. By way of example, if a first text box is included on the HMI screen, there might be respective probabilities that a particular second text box, user option, or chart is also included on the HMI screen. Further, the conditional probability distributions can indicate the probabilities of various data properties of HMI elements given other HMI elements on a given HMI screen. By way of further example, if the first text box on the HMI screen with a particular chart, there might be respective probabilities related to the size of the first text box and arrangement of the first text box relative to the chart.

Still referring to FIG. 3, at 306, the computing system 200 can receive an indication of a particular HMI element. Based on the indication and the conditional probability distributions, at 308, the computing system 200 can determine predictions associated with the particular HMI element. In particular, for example, the GAN 201 can predict the properties associated with the particular HMI element. The predictions can indicate the most likely set of properties for the given HMI element, and for each element that is input in the GAN 201. In particular, for example and without limitation, the GAN 201 can predict the most likely height, width, and other geometric properties of the given HMI element.

Figure 4:
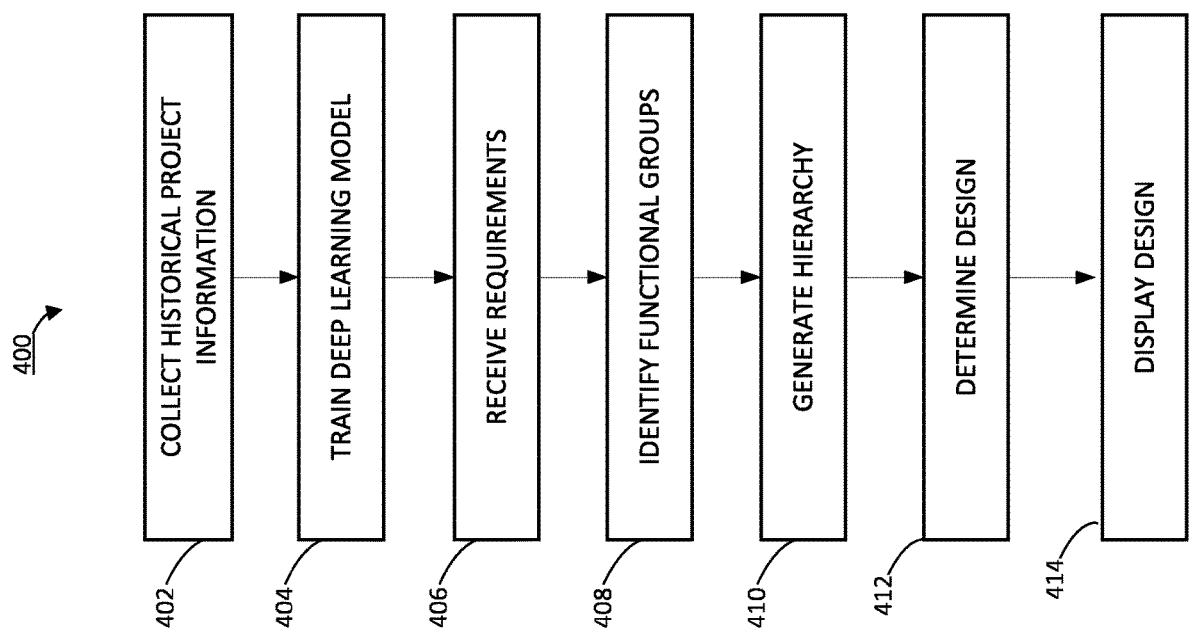
FIG. 4 is another flow diagram that depicts other operations that can be performed by the computing system depicted in FIG. 3, in accordance with another example embodiment.

Referring now to FIG. 4, another example operation 400 can be performed by the computing system 200. At 402, the computing system 200 can collect historical project information. In some cases, the GAN 201 can obtain the historical project information from the database 225. The historical project information can include HMI designs for a plurality of HMI screens. The HMI designs can define a plurality of different arrangements of a plurality of different HMI elements. At 404, the GAN 201 is trained on input data, for instance the historical project information. The training data, in particular the HMI projects, can further define various properties of the HMI elements on various historical HI screens. Example properties of the HMI elements that can be obtained by the GAN 201 include, without limitation, size properties associated with the elements (e.g., height, width), color, and spatial constraints. Spatial constraints can define various tolerances, such as minimum or maximum distances from other elements or portions (e.g., edge, center) of the screen. At 406, the computing system 200 can receive inputs or requirements for a new arrangement or new design. For example, the inputs can include HMI panel specifications (e.g., 800×600 pixels) and a list of HMI elements for arranging on an HMI screen having the HMI panel specifications. Thus, the GAN 201 can receive requirements for a new project that defines a list of HMI elements for at least one target HMI screen.

With continuing reference to FIG. 4, at 408, the computing system 200 can identify functional groups of HMI elements. A functional group may define a set of HMI elements that can used in combination with each other to perform a function. For example, a chart element and zoom-in and zoom-out buttons can be combined so as to define a data inspection functional group. In some cases, the functional groups are mined from HMI projects that are stored in the database 225. At 410, the computing system 200, in particular the GAN 201, can generate a hierarchy defining priorities of HMI elements. For example, based on its training, the GAN 201 can predict which HMI elements are displayed on a given target HMI screen when the target HMI screen defines a limited size or otherwise cannot display every HMI element associated with the requirements. In some cases, the functional groups of HMI elements can be presented to a user, such that the user can select particular HMI elements for a design while maintaining the functional groups. Alternatively, or additionally, the system 200, based on its training, can select particular HMI elements for display. In particular, at 412, the GAN 201 can determine a design for the list of HMI elements on the target HMI screen(s). In some examples, the system 200 generates an XML based on the requirements. At 414, the one or more target HMI screens can display the design.

Thus, as described herein, a computing system can include a target HMI screen configured to display HMI elements, a processor, and a memory storing instructions. By executing the instructions, the processor can collect historical project information that comprises HMI designs for a plurality of HMI screens. The HMI designs can define a plurality of arrangements of a plurality of HMI elements. The processor can further be configured to receive requirements for a new project. The requirements can define a list of HMI elements and specifications for the target HMI screen. Based on the requirements, the computing system can determine a design for the list of HMI elements on the target HMI screen, wherein the target HMI screen is further configured to display the design of the new project. In various examples, the target HMI screen defines one or more PC-based monitors, a mobile device display or a display for a SCADA server. The historical project information can include a plurality of data properties associated with each of the plurality of HMI elements. Further, the processor can learn the plurality of data properties associated with each of the plurality of HMI elements so as to identify common data properties associated with each of the plurality of HMI elements. In various examples, the common data properties define at least one of a size, color, or spatial constraint. In an example, the system determines the design based on learning the plurality of data properties, and at least one HMI element in the design from the list of HMI elements defines at least one of its common data properties.

In some examples, based on the historical project information, the computing system, for instance the system 200, can determine respective probabilities for each HMI element of the plurality of HMI elements. The probabilities can define likelihoods of a respective HMI element of the plurality of HMI elements being displayed with each of the other HMI elements of the plurality of HMI element. In an example, based on the probabilities and a size constraint of the target HMI screen, the system 200 can identify at least HMI element from the list of HMI elements that can be omitted from the target HMI screen. The GAN 201 can omit the identified HMI element(s) from the design. As described herein, the historical information can also include a plurality of data properties associated each of the plurality of HMI elements. The GAN 201 can learn the plurality of data properties associated with each of the plurality of HMI elements so as to identify common data properties associated with each of the plurality of HMI elements. The common data properties can define at least one of a size, color, or spatial constraint. In various examples, the GAN 201 can determine the design based on learning the plurality of data properties, such that at least one HMI element in the design from the list of HMI elements defines at least one of its common data properties, thereby maintaining the historical look and feel of an HMI screen in the new HMI screen design.

Figure 5:
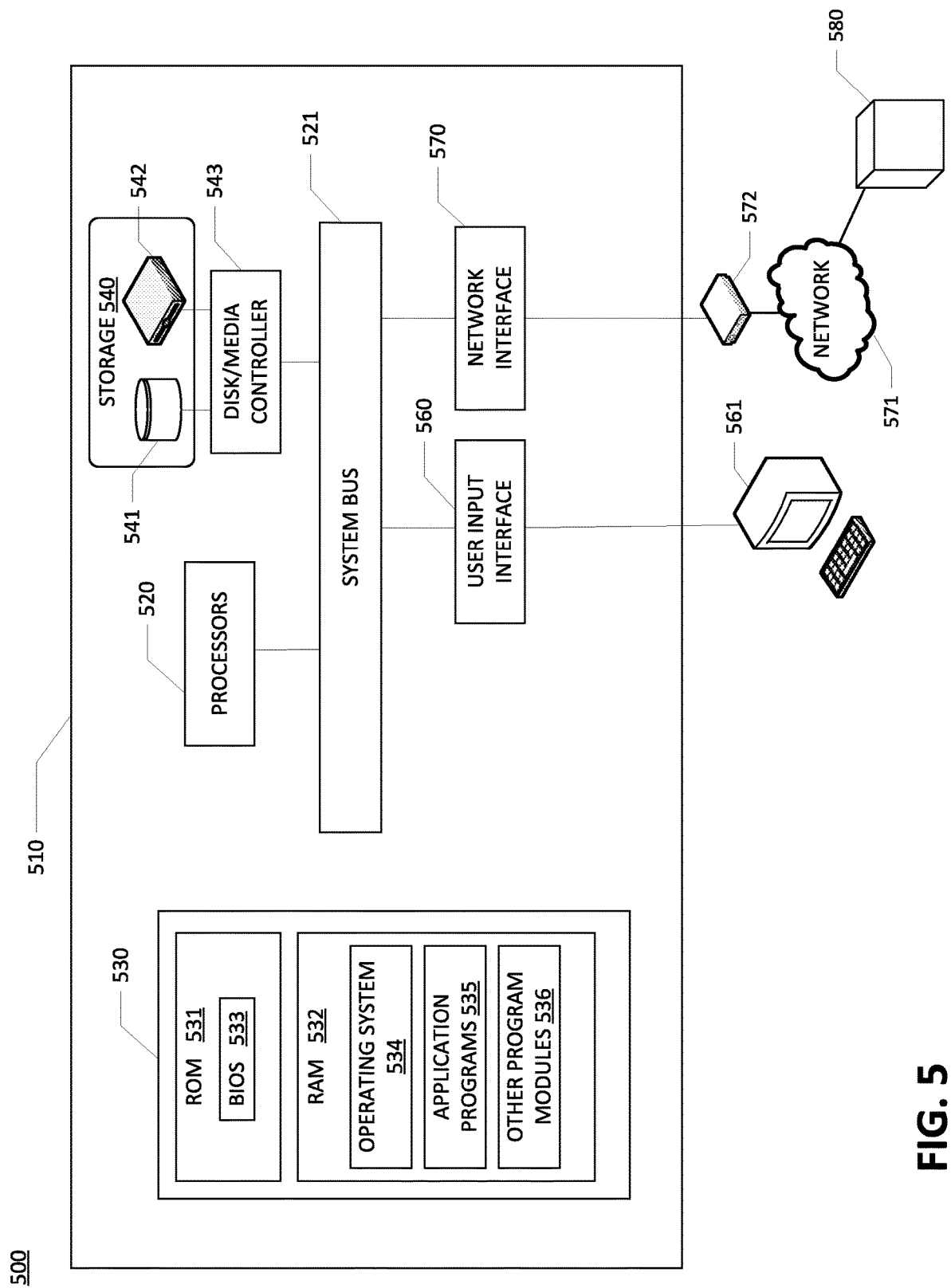
FIG. 5 illustrates a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. HMI screens, panels, or displays may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 5, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 (or solid state drive) and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 500 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed by a computing system comprising a generative adversarial network (GAN), the method comprising:
   collecting historical project information that comprises human-machine interface (HMI) designs for a plurality of HMI screens, the HMI designs defining a plurality of arrangements of a plurality of HMI elements;
   training the generative adversarial network (GAN) with the historical project information;
   receiving, by the GAN, requirements for a new project, the requirements defining a list of HMI elements and specifications for at least one target HMI screen; and
   based on the requirements, the GAN determining a design for the list of HMI elements on the at least one target HMI screen.

2. The method as recited in claim 1, wherein determining the design further comprises:
   based on the historical project information, determining respective probabilities for each HMI element of the plurality of HMI elements, the probabilities defining likelihoods of a respective HMI element of the plurality of HMI elements being displayed with each of the other HMI elements of the plurality of HMI elements.

3. The method as recited claim 2, determining the design further comprises:
   based on the probabilities and a size constraint of the last one target HMI screen, identifying at least HMI element from the list of HMI elements that can be omitted from the at least on target HMI screen; and
   omitting the at least one HMI element from the design.

4. The method as recited in claim 1, wherein the historical project information further comprise a plurality of data properties associated each of the plurality of HMI elements.

5. The method as recited claim 4, wherein training the GAN further comprises:
   learning the plurality of data properties associated with each of the plurality of HMI elements so as to identify common data properties associated with each of the plurality of HMI elements,
   wherein the common data properties define at least one of a size, color, or spatial constraint.

6. The method as recited in claim 5, the method further comprising:
   based on learning the plurality of data properties, determining the design,
   wherein at least one HMI element in the design from the list of HMI elements defines at least one of its common data properties.

7. A computing system comprising:
   a target human-machine interface (HMI) screen configured to display HMI elements;
   a processor; and
   a memory storing instructions that, when executed by the processor, cause the processor to:
      collect historical project information that comprises HMI designs for a plurality of HMI screens, the HMI designs defining a plurality of arrangements of a plurality of HMI elements;
      receive requirements for a new project, the requirements defining a list of HMI elements and specifications for the target HMI screen; and
      based on the requirements, determine a design for the list of HMI elements on the target HMI screen,
      wherein the target HMI screen is further configured to display the design of the new project.

8. The computing system as recited in claim 7, wherein the target HMI screen defines one or more PC-based monitors, a mobile device display, or a display for a Supervisory Control and Data Acquisition server.

9. The computing system as recited in claim 7, the memory further storing instructions that, when executed by the processor, further cause the processor to:
   based on the historical project information, determine respective probabilities for each HMI element of the plurality of HMI elements, the probabilities defining likelihoods of a respective HMI element of the plurality of HMI elements being displayed with each of the other HMI elements of the plurality of HMI elements.

10. The computing system as recited in claim 7, the memory further storing instructions that, when executed by the processor, further cause the processor to:

based on the probabilities and a size constraint of the target HMI screen, identify at least HMI element from the list of HMI elements that can be omitted from the target HMI screen; and omit the at least one HMI element from the design.

11. The computing system as recited in claim 7, wherein the historical project information further comprises a plurality of data properties associated each of the plurality of HMI elements.

12. The computing system as recited in claim 11, the memory further storing instructions that, when executed by the processor, further cause the processor to:

learn the plurality of data properties associated with each of the plurality of HMI elements so as to identify common data properties associated with each of the plurality of HMI elements, wherein the common data properties define at least one of a size, color, or spatial constraint.

13. The computing system as recited in claim 12, the memory further storing instructions that, when executed by the processor, further cause the processor to:

based on learning the plurality of data properties, determine the design, wherein at least one HMI element in the design from the list of HMI elements defines at least one of its common data properties.

* * * * *